(12) United States Patent
Spence

(10) Patent No.: US 7,037,185 B1
(45) Date of Patent: May 2, 2006

(54) FISH SCALING SYSTEM

(76) Inventor: Roy Spence, 2411 Church Ave., Brooklyn, NY (US) 11226

( * ) Notice: Subject to any disclaimer, the term of this patent is extended or adjusted under 35 U.S.C. 154(b) by 0 days.

(21) Appl. No.: 11/081,466

(22) Filed: Mar. 16, 2005

(51) Int. Cl.
*A22C 25/02* (2006.01)

(52) U.S. Cl. ........................................... 452/99
(58) Field of Classification Search .................... None
See application file for complete search history.

(56) References Cited

U.S. PATENT DOCUMENTS

| | | | | |
|---|---|---|---|---|
| 2,172,472 A * | 9/1939 | Grow | ............................ | 452/81 |
| 2,664,591 A * | 1/1954 | Brophy | ........................... | 452/99 |
| 2,795,812 A * | 9/1957 | Godfrey | ......................... | 452/99 |
| 3,088,164 A * | 5/1963 | Simard | ........................... | 452/99 |
| 3,787,927 A * | 1/1974 | Simard | ........................... | 452/99 |
| 4,219,906 A * | 9/1980 | Crossland et al. | ........... | 452/140 |
| 4,485,526 A * | 12/1984 | Opanasenko | .................. | 452/99 |
| 4,731,908 A * | 3/1988 | Thorsen | ......................... | 452/74 |
| 4,868,950 A * | 9/1989 | Harben, Jr., | ................... | 452/77 |
| 5,230,652 A * | 7/1993 | Alam | ............................ | 452/98 |
| 5,520,576 A * | 5/1996 | Wastell et al. | ............... | 452/161 |
| 6,019,033 A * | 2/2000 | Wilson et al. | ................. | 99/470 |
| 6,368,203 B1 * | 4/2002 | Puretz | ........................... | 452/81 |
| 6,551,182 B1 * | 4/2003 | Caracciolo, Jr. | .............. | 452/81 |

* cited by examiner

*Primary Examiner*—Thomas Price
(74) *Attorney, Agent, or Firm*—Edward P. Dutkiewicz

(57) ABSTRACT

A housing has an interior with first and second ends and top and bottom faces. The housing has an air flow aperture in the top face. The housing has a debris aperture in the bottom face. The bottom face rests upon adjustable legs. Blades with cutting edges are provided in the housing in a cylindrical configuration. A first set of blades is adjacent to the top face. A second set of blades is adjacent to the bottom face. The sets of blades are independently rotatably coupled on a belt driven mount support subsystem each powered by a motor. A plurality of sensors is provided within the interior of the housing. A plurality of control switches controls the operation of the system.

2 Claims, 3 Drawing Sheets

FISH SCALING SYSTEM

BACKGROUND OF THE INVENTION

1. Field of the Invention

The present invention relates to a fish scaling system and more particularly pertains to automatically removing scales from a fish in a safe and sanitary manner.

2. Description of the Prior Art

The use of fish scalers of known designs and configurations is known in the prior art. More specifically, fish scalers of known designs and configurations previously devised and utilized for the purpose of fish scalers of known designs and configurations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,399,588 to Molnar discloses an automatic fish feeder and orientator and U.S. Pat. No. 4,945,608 to Majure et al discloses a fish scaler.

While these devices fulfill their respective, particular objectives and requirements, the aforementioned patents do not describe fish scaling system that allows automatically removing scales from a fish in a safe and sanitary manner.

In this respect, the fish scaling system according to the present invention substantially departs from the conventional concepts and designs of the prior art, and in doing so provides an apparatus primarily developed for the purpose of automatically removing scales from a fish in a safe and sanitary manner.

Therefore, it can be appreciated that there exists a continuing need for a new and improved fish scaling system which can be used for automatically removing scales from a fish in a safe and sanitary manner. In this regard, the present invention substantially fulfills this need.

SUMMARY OF THE INVENTION

In view of the foregoing disadvantages inherent in the known types of fish scalers of known designs and configurations now present in the prior art, the present invention provides an improved fish scaling system. As such, the general purpose of the present invention, which will be described subsequently in greater detail, is to provide a new and improved fish scaling system and method which has all the advantages of the prior art and none of the disadvantages.

To attain this, the present invention essentially comprises a fish scaling system. First provided is a housing. The housing has a generally enclosed interior. The housing has a first end, a second end, a top face, a bottom face and a pair of side faces. The housing has an entry point. The entry point has a retractable slide tray. The slide tray is positioned on the first end. The housing has an exit point. The exit point has a drop tray. The drop tray is positioned on the second end. The housing has an air flow aperture. The air flow aperture is positioned in the top face. The housing has a debris aperture. The debris aperture is positioned in the bottom face. The housing has a plurality of adjustable legs. The bottom face rests upon the adjustable legs.

A fan is provided. The fan is positioned adjacent to the air flow aperture of the housing. The fan is adapted to transfer air in the air flow aperture through the housing interior and out the debris aperture.

Provided next is a trash exhaust chute. The trash exhaust chute is positioned adjacent to the debris aperture of the housing. The trash exhaust chute is adapted to receive debris produced by the system. The trash exhaust chute further has a bag attachment. In this manner clean disposal of the collected debris is allowed.

A plurality of blades is provided. The blades have a cylindrical configuration. The blades have a plurality of longitudinal cutting edges. The blades include a first set of blades. The first set of blades is positioned adjacent to the top face and within the interior of the housing. The first set of blades is adapted to rotate in a clockwise rotation. The blades include a second set of blades. The second set of blades is positioned adjacent to the bottom face and within the interior of the housing. The second set of blades is adapted to rotate in a counterclockwise rotation. A belt driven mount support subsystem is provided. The first set and second set of blades are independently rotatably coupled on the mount support subsystem. Each set of blades is powered by an individual AC motor. The mount support subsystem further enables the blades sets to raise and lower independently to effectively contact the surface of a fish being scaled and follow the contour of the fish as it pass between the set of blades. The rotation of the blade sets are adapted to move the fish from the entry point to the exit point while the cutting surfaces of the blade functions to remove the scales from a fish. A receptacle is provided. The fan assists gravity to move the scales through the debris aperture and the trash exhaust chute and into the receptacle.

Further provided is a plurality of sensors. The sensors are provided within the interior of the house. The sensors are adapted to detect the presence of a fish within the housing. The sensors include a first sensor. The first sensor is positioned at the entry point of the system. The first sensor is adapted to activate the blade and the fan.

Provided last is a plurality of control switches. The control switches are adapted to control the overall operation of the system. The overall operation of the system includes turning the system on and off. The overall operation of the system further includes adjusting of the speed at which the blade turn.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fish scaling system which has all of the advantages of the prior art fish scalers of known designs and configurations and none of the disadvantages.

It is another object of the present invention to provide a new and improved fish scaling system which may be easily and efficiently manufactured and marketed.

It is further object of the present invention to provide a new and improved fish scaling system which is of durable and reliable constructions.

An even further object of the present invention is to provide a new and improved fish scaling system which is susceptible of a low cost of manufacture with regard to both materials and labor, and which accordingly is then susceptible of low prices of sale, thereby making such fish scaling system economically available.

Even still another object of the present invention is to provide a fish scaling system for automatically removing scales from a fish in a safe and sanitary manner.

Lastly, it is an object of the present invention to provide a new and improved fish scaling system. A housing has an interior with first and second ends and top and bottom faces. The housing has an air flow aperture in the top face. The housing has a debris aperture in the bottom face. The bottom face rests upon adjustable legs. Blades with cutting edges are provided in the housing in a cylindrical configuration. A first set of blades is adjacent to the top face. A second set of blades is adjacent to the bottom face. The sets of blades are independently rotatably coupled on a belt driven mount support subsystem each powered by a motor. A plurality of sensors is provided within the interior of the housing A plurality of control switches controls the operation of the system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
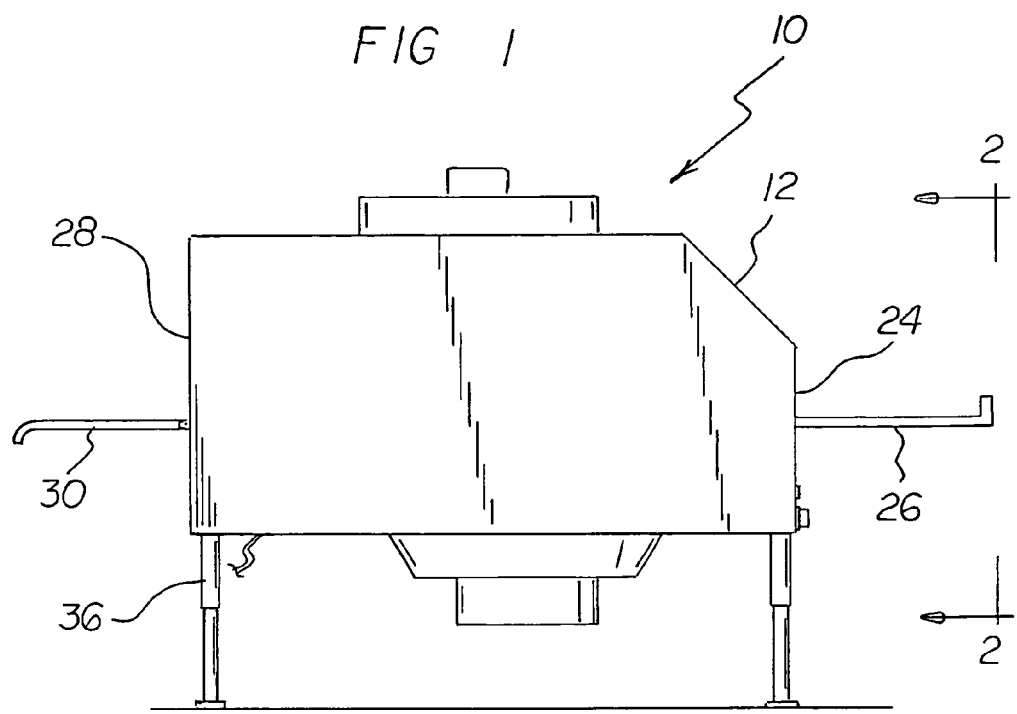
FIG. 1 is a plan view of the system constructed in accordance with the principles of the present invention.
Figure 2:
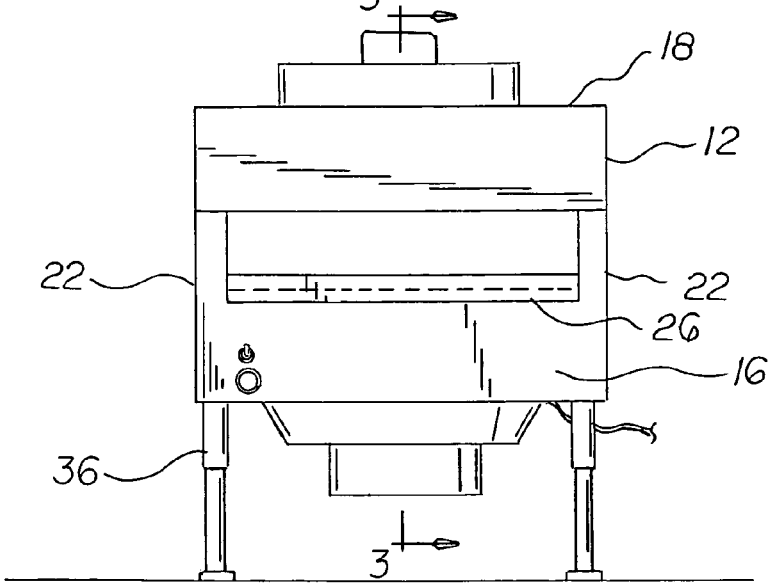
FIG. 2 is an end view of the system taken along line 2—2 of FIG. 1.

With reference now to the drawings, and in particular to FIG. 1 thereof, the preferred embodiment of the new and improved fish scaling system embodying the principles and concepts of the present invention and generally designated by the reference numeral 10 will be described.

The present invention, the fish scaling system 10 is comprised of a plurality of components. Such components in their broadest context include a housing, blades, a plurality of sensors and a plurality of control switches. Such components are individually configured and correlated with respect to each other so as to attain the desired objective.

First provided is a housing 12. The housing has a generally enclosed interior 14. The housing has a first end and a second end 16, a top face 18, a bottom face 20 and a pair of side faces 22. The housing has an entry point 24. The entry point has a retractable slide tray 26. The slide tray is positioned on the first end. The housing has an exit point 28. The exit point has a drop tray 30. The drop tray is positioned on the second end. The housing has an air flow aperture 32. The air flow aperture is positioned in the top face. The housing has a debris aperture 34. The debris aperture is positioned in the bottom face. The housing has a plurality of adjustable legs 36. The bottom face rests upon the adjustable legs.

A fan 38 is provided. The fan is positioned adjacent to the air flow aperture of the housing. The fan is adapted to transfer air in the air flow aperture through the housing interior and out the debris aperture.

Provided next is a trash exhaust chute 40. The trash exhaust chute is positioned adjacent to the debris aperture of the housing. The trash exhaust chute is adapted to receive debris produced by the system. The trash exhaust chute further has a bag attachment 42. In this manner clean disposal of the collected debris is allowed.

A plurality of blades 44 is provided. The blades have a cylindrical configuration. The blades have a plurality of longitudinal undulating cutting edges 46. The blades include a first set of blades 48. The first set of blades is positioned adjacent to the top face and within the interior of the housing. The first set of blades is adapted to rotate in a clockwise rotation. The blades include a second set of blades 50. The second set of blades is positioned adjacent to the bottom face and within the interior of the housing. The second set of blades is adapted to rotate in a counterclockwise rotation. A belt driven mount support subsystem comprising an upper support system 52A and a lower support system 52B is provided. The first set of blades is rotatably coupled on the upper support subsystem. The second set of blades is rotatably coupled on the lower support subsystem. Each set of blades is powered by an individual AC motor 54. The mount support systems enable the blades sets to raise and lower independently of each other to effectively contact the surface of a fish being scaled and follow the contour of the fish as it pass between the set of blades. The rotation of the blade sets are adapted to move the fish from the entry point to the exit point while the cutting surfaces of the blade functions to remove the scales from a fish.

Figure 3:
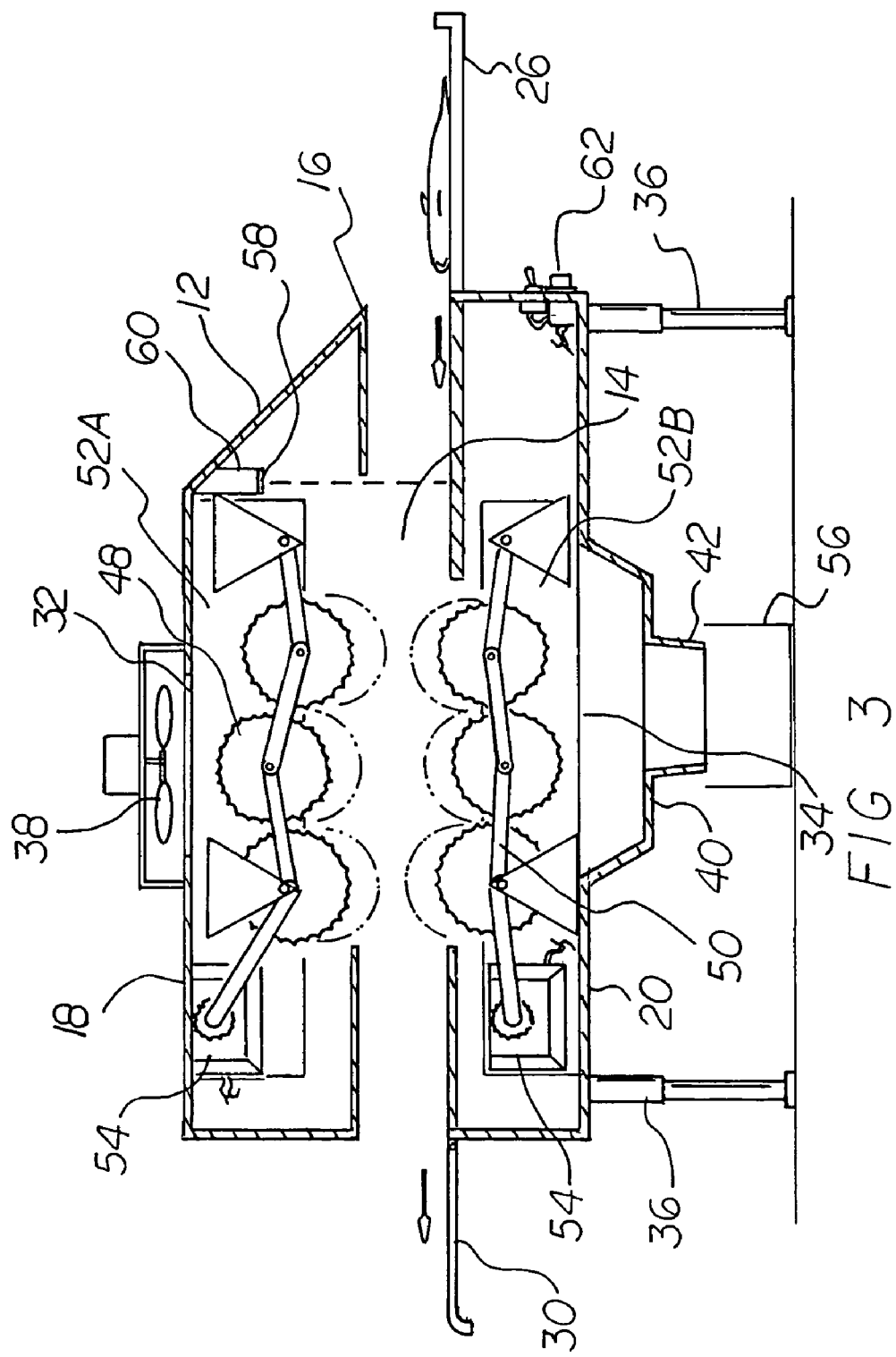
FIG. 3 is a cross sectional view taken along line 3—3 of FIG. 2.
Figure 4:
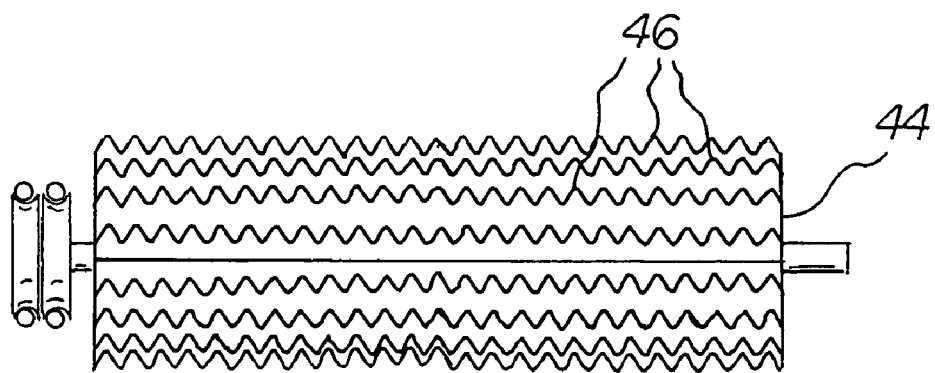
FIG. 4 is an elevational view of one of the blades shown in the prior Figures.

FIG. 3 illustrates in solid lines the blades in a widely spaced extended orientation when the blades are at rest. The dotted line illustration of the blades is a narrowly spaced operating orientation with the blades ready for rotating and scaling a fish. When in the operating orientation, the presence of a heavier fish will allow the rollers to spring urge away from each other to achieve a more efficient scaling of the fish. The electronic controls allow the movement of the rollers along with their drive mechanisms between the operating orientation and the rest orientation.

A receptacle 56 is provided. The fan assists gravity to move the scales through the debris aperture and the trash exhaust chute and into the receptacle.

Further provided is a plurality of sensors 58. The sensors are provided within the interior of the house. The sensors are adapted to detect the presence of a fish within the housing. The sensors include a first sensor 60. The first sensor is positioned at the entry point of the system. The first sensor is adapted to activate the blade and the fan.

Provided last is a plurality of control switches 62. The control switches are adapted to control the overall operation of the system. The overall operation of the system includes turning the system on and off. The overall operation of the system further includes adjusting of the speed at which the blade turn.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish scaling system comprising;
    a housing having an interior with first and second ends, top and bottom faces, an air flow aperture in the top face and a debris aperture in the bottom face, the bottom face resting upon adjustable legs;
    blades with cutting edges in the housing in a cylindrical configuration with a first set of blades adjacent to the top face and a second set of blades adjacent to the bottom face, the sets of blades each independently rotatably coupled on a belt driven mount support subsystem each set of blades being independently powered by a motor;
    a plurality of sensors within the interior of the housing;
    a plurality of control switches for controlling the operation of the system, and
    a fan positioned adjacent to the air flow aperture of the housing.

2. A fish scaling system for automatically removing scales from a fish in a safe and sanitary manner comprising, in combination;
    a housing having a generally enclosed interior with a first end, a second end, a top face, a bottom face and a pair of side faces, an entry point with a retractable slide tray being positioned on the first end, an exit point with a drop tray being positioned on the second end, an air flow aperture positioned in the top face and a debris aperture positioned in the bottom face, the bottom face resting upon a plurality of adjustable legs;
    a fan positioned adjacent to the air flow aperture of the housing and adapted to transfer air in the air flow aperture through the housing interior and out the debris aperture;
    a trash exhaust chute positioned adjacent to the debris aperture of the housing and adapted to receive debris produced by the system, the trash exhaust chute further having a bag attachment to allow clean disposal of the collected debris;
    a plurality of blades having a cylindrical configuration with a plurality of longitudinal undulating cutting edges, a first set of blades being positioned adjacent to the top face and within the interior of the housing and adapted to rotate in a clockwise rotation, a second set of blades being positioned adjacent to the bottom face and within the interior of the housing and adapted to rotate in a counterclockwise rotation, the first set and second set of blades each being independently rotatably coupled on a belt driven mount support subsystem, each set of blades being powered by an individual AC motor, the mount support subsystem further enabling the blades sets to raise and lower independently to effectively contact the surface of a fish being scaled and follow the contour of the fish as it pass between the set of blades, the rotation of the blade sets adapted to move the fish from the entry point to the exit point while the cutting surfaces of the blade functions to remove the scales from a fish while the fan assists gravity to move the scales through the debris aperture and the trash exhaust chute and into a receptacle;
    a plurality of sensors within the interior of the house being adapted to detect the presence of a fish within the housing with a first sensor being positioned at the entry point of the system and sensor being adapted to activate the blade and the fan; and
    a plurality of control switches adapted to control the overall operation of the system including the turning the system on and off as well as the adjusting of the speed at which the blade turn.

\* \* \* \* \*